United States Patent [19]
Schabdach et al.

[11] Patent Number: 6,132,356
[45] Date of Patent: Oct. 17, 2000

[54] PORTABLE SYSTEM FOR VAPOR, AEROSOL OR AIRBORNE HAZARD SUPPRESSION OF HAZARDOUS ENVIRONMENTAL SPILLS

[75] Inventors: Paul G. Schabdach, Churchville; James A. Genovese, Street, both of Md.

[73] Assignee: The United States of America as represented by the Secretary of the Army, Washington, D.C.

[21] Appl. No.: 09/179,356

[22] Filed: Oct. 15, 1998

[51] Int. Cl.[7] ................................................ G21F 5/00
[52] U.S. Cl. .......................... 588/260; 588/DIG. 900; 405/52; 405/303
[58] Field of Search ............................ 405/52, 303, 128; 206/524.4, 524.5; 588/260, 249, DIG. 900; 210/922, 923

[56] References Cited

U.S. PATENT DOCUMENTS

| | | | |
|---|---|---|---|
| 4,650,086 | 3/1987 | Morrison, Jr. | 588/260 X |
| 4,796,676 | 1/1989 | Hendershot et al. | 141/83 |
| 5,035,537 | 7/1991 | Rose | 405/128 |
| 5,169,566 | 12/1992 | Stucky et al. | 252/635 |
| 5,199,795 | 4/1993 | Russo et al. | 383/113 |
| 5,228,804 | 7/1993 | Balch | 405/128 |
| 5,436,385 | 7/1995 | Kaden | 588/249 |
| 5,465,536 | 11/1995 | Buchanan et al. | 588/249 X |
| 5,601,382 | 2/1997 | Corte | 405/128 |
| 5,775,840 | 7/1998 | Knieper | 405/128 |
| 5,893,680 | 4/1999 | Lowry et al. | 405/128 |
| 5,911,336 | 6/1999 | Porta et al. | 206/524.4 |

*Primary Examiner*—David Bagnell
*Assistant Examiner*—Tara L. Mayo
*Attorney, Agent, or Firm*—Ulysses John Biffoni; Vincent J. Ranucci

[57] ABSTRACT

The invention provides a portable apparatus and a method for quickly containing, suppressing and mitigating localized hazardous material spills. The hazardous material containment apparatus has a vapor, aerosol and particulate containment vessel having a cover and side walls attached around a perimeter of the cover to define an open central cavity. Each of the cover and side walls are composed of a material which resists penetration of a hazardous material therethrough. A tube extending through the vessel has a first end open at a point inside the cavity and a second end at a point outside the vessel. Vacuum and filtration systems are attached to the second end of the tube for extracting a hazardous material from inside the cavity to outside the vessel through the tube.

21 Claims, 1 Drawing Sheet

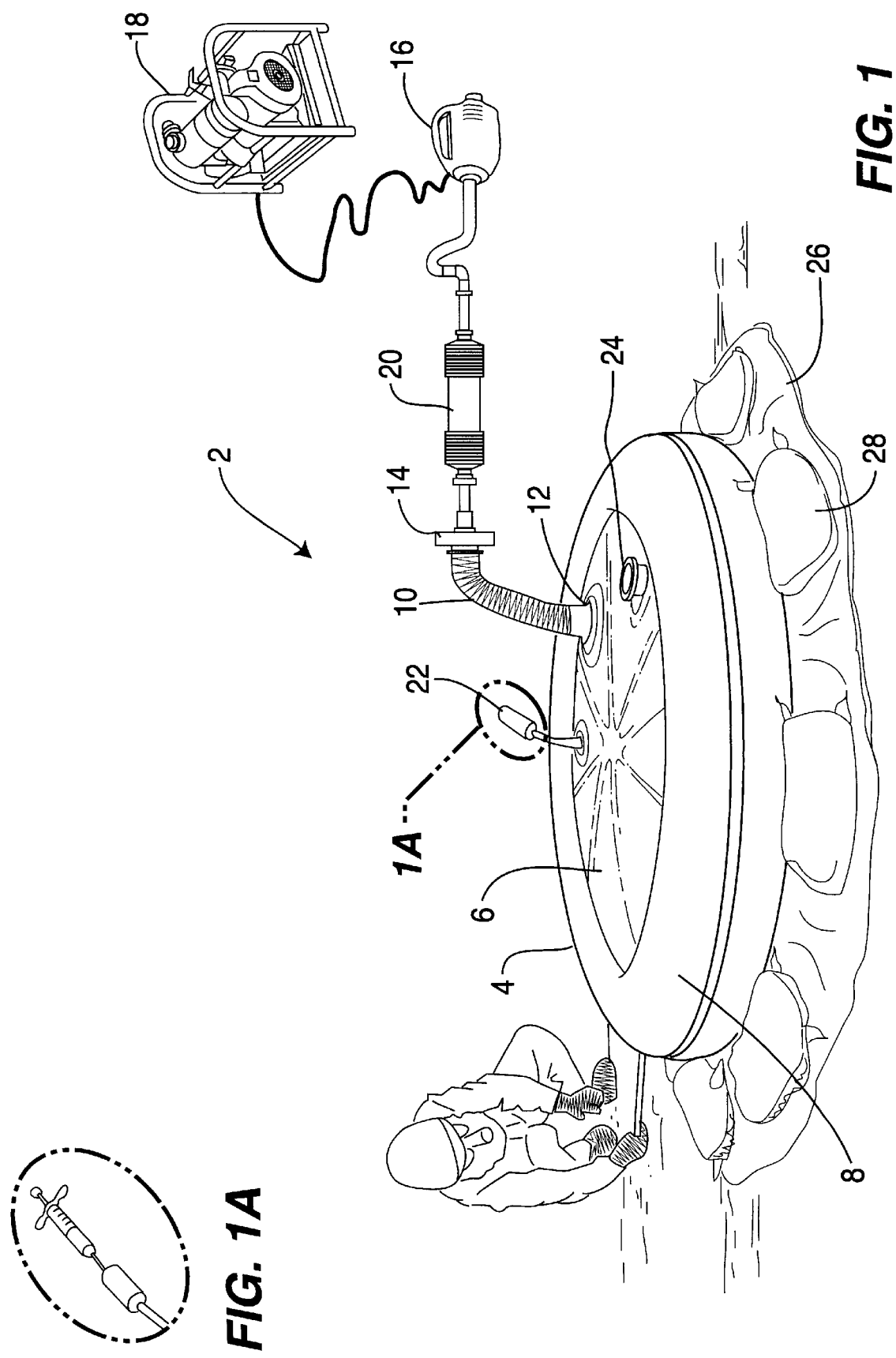

PORTABLE SYSTEM FOR VAPOR, AEROSOL OR AIRBORNE HAZARD SUPPRESSION OF HAZARDOUS ENVIRONMENTAL SPILLS

GOVERNMENT INTEREST

The invention described herein may be manufactured, licensed, and used by or for the U.S. Government.

BACKGROUND OF THE INVENTION

Field of the Invention

The present invention pertains to an apparatus for the containment and suppression of hazardous material spills. More particularly, the invention pertains to a portable apparatus for quickly containing and suppressing localized hazardous material spills, including biological, chemical or radiological particulates until rigorous clean-up or other more permanent containment means can be employed.

DESCRIPTION OF THE RELATED ART

In the prior art, hazardous materials spills have principally been attended to by use of an absorbent device to contain the spill until clean up can be performed. However, this does not address control of vapors or off-gases originating from the hazardous material spill. Containment of military chemical agents such as nerve and mustard agents not only need liquid spill control but also require vapor or aerosol suppression. Terrorist incidents require means for quick, portable, vapor or aerosol suppression after an intentional release. Hazardous material spills may not only be in liquid form, but may also be comprised of particulate materials such as biological or radiological agents such as anthrax spores or radioactive fallout. Prior art absorbent materials would be ineffective against such materials due to the likelihood of resuspension from wind or the like. It would be desirable to provide an apparatus for the mitigation of solid, liquid and vaporous hazardous materials that can be deployed quickly.

The invention provides an apparatus having a cover with rigid or inflatable sides which is light weight, inexpensive, and can quickly and easily be deployed by one person to cover a localized spill. A portable vacuum type air filtering mechanism filters the air drawn out from inside the system and maintains a negative pressure, i.e., a pressure less than atmospheric pressure, inside the system. An apron secured with grommets, rings, sandbags or weight secure the apparatus on the ground or other foundation. The apparatus has an optional sampling port for testing the encompassed hazardous material and an optional injection port for adding absorbents, foams or decontamination materials.

SUMMARY OF THE INVENTION

The invention provides a hazardous material containment or suppression apparatus which comprises a vapor or aerosol containment vessel comprising a cover and side walls attached around a perimeter of the cover to define an open central cavity. Each of the cover and side walls are composed of materials which resist penetration of a hazardous material therethrough. A tube extending through the vessel has a first end open at a point inside the cavity and a second end at a point outside the vessel. Means are attached to the second end of the tube for extracting and filtering hazardous material from inside the cavity to outside the vessel through the tube.

The invention also provides a method of containing or suppressing a hazardous material which comprises surrounding a hazardous material with the above described hazardous material containment apparatus and then extracting and filtering the hazardous material from inside the cavity to outside the vessel through the tube.

The apparatus is placed as a cover over a hazardous material spill in order to contain or suppress any off-gas or other release from the hazardous material, which may be in the form of a liquid, solid or gas. It is effective against the vaporization or aerosolization of biological, chemical and radiological hazards such as those which may be resuspended by the mechanical action of turbulent air flow.

BRIEF DESCRIPTION OF THE DRAWING

FIGS. 1 and 1a are schematic representations of the deployment of the apparatus according to the invention.

DETAILED DESCRIPTION OF THE PREFERRED EMBODIMENT

Referring to FIGS. 1 and 1a, there is shown a hazardous material containment apparatus 2 which comprises a vapor containment vessel 4. The vessel has a cover 6 and side walls 8 attached around the perimeter of the cover. The cover 6 and side walls 8 define an open central cavity which in FIG. 1 is under the downwardly positioned cover 6 and side walls 8. Each of the cover and side walls is composed of a material which resists penetration of a hazardous material therethrough. Such materials can be rubber, PVC or a variety of plastics with a low probability of reacting with or allowing the penetration of the hazardous material. The side walls can be substantially rigid or may be flexible or most preferably the side walls are inflatable. The outside diameter of the side walls can be of any convenient dimension such as from about one foot or less to about twenty feet or more in diameter. Although the drawing shows the apparatus to be circular, it can have a non-circular configuration.

A tube 10 extends through the vessel at any convenient point. The tube has a first end 12 which is open inside the cavity and a second end 14 outside the vessel 4. Attached to the second end 14 of tube 10 is a means for extracting and filtering a hazardous material from inside the cavity to outside the vessel through the tube and preferably into a suitable container. In the preferred embodiment, the means is a vacuum system 16 which may be powered by a portable generator 18. In the preferred embodiment, there a suitable filter 20 attached either at the first end of the tube, at the second end of the tube, or between the first and second ends of the tube. This vacuum pump/filtration system maintains a negative pressure (a pressure less than atmospheric) within the system with respect to ambient, thus preventing or mitigating leakage out of the containment system. The filter may be any filter which is suitable to the type of hazardous material to be confined. Such may include a High-Efficiency Particulate Air (HEPA) filter, a chemical or biological material filter, a canister for organic vapors, acid gases, dusts, mists, chlorine, ammonia, methylamine, pesticides or other filters as would be well known to the skilled artisan. In the preferred embodiment, the apparatus also includes a sampling port 22 extending through the vessel for sampling the hazard or verifying the effectiveness of decontamination materials used on the hazard. Such may be done, for example by a syringe. The apparatus may preferably have an injection orifice 24 extending through the vessel through which one may insert decontaminants, absorbents or foam suppression materials onto the hazard. Decontaminants such as bleach or a variety of well known foams or other neutralizing material may be inserted into the containment area to reduce the hazard. The apparatus may also have pads, rolls, booms, mini-booms, pillows or rugs of absorbent material which may be attached inside the containment area perimeter by VELCRO or hook and loop type fastener or other means of attachment to preclude gross liquid seepage around the perimeter of the device.

Alternatively, the orifice 24 can also be used as an opening for vacuuming out the hazard while containing the vapor. This assists in reduction of the hazard.

Preferably the apparatus has an apron 26 attached to and surrounding the side walls 8 at a wall edge opposite to the cover. Such may be used to hold the overall apparatus to the ground or other foundation by means of weights such as sandbags 28, water bags, or by means of tie downs through rings or grommets.

In the event of a hazardous material spill, the apparatus can be easily deployed by a single individual. The user inflates or otherwise erects the side walls 8, places weights 28 around apron 26 and connects the filter 20 and vacuum mechanism 16. The apparatus is placed over the contaminated area such that it surrounds the hazardous material to effect hazard suppression within the walls and cover. One optionally inserts a contamination neutralization material through injection port 24 and then extracts the hazardous material from inside the cavity to outside the vessel through the tube 10 and filter 20 by creating a negative pressure environment under the vessel by engaging vacuum pump 16. In the usual case, normal air leakage from under the apron provides sufficient make-up air to keep the apparatus from collapsing under the negative pressure from the vacuum. If desired, additional make-up air may be provided by adding an automatic or manual one way damper valve through the vessel. Such may allow sufficient make-up air to enter into the apparatus to preclude collapse but yet not so much to negate the effect of the negative pressure inside the containment area.

As a result, vaporization of volatile liquids and re-aerosolization of particulates is greatly mitigated. In addition, since the apparatus is a covering which stands a few inches off the ground, it allows for the addition of sorbents and neutralizers, allows facile viewing of the hazard, if necessary, and allows for a better negative pressure than if plain plastic sheets were used.

It is to be understood that the foregoing preferred embodiment is provided for illustrative purposes, and is not intended to limit the scope of the invention in any way.

What is claimed is:

1. A hazardous material containment apparatus, which comprises:
    (a) a vapor and aerosol containment vessel comprising a cover and side walls attached around a perimeter of said cover, which cover and side walls define an open central cavity therein; each of said cover and side walls being composed of material which resists penetration of gases, vapors, aerosols and airborne particulates therethrough;
    (b) a tube extending through said vessel, said tube having a first end open at a point inside said cavity and a second end at a point outside said vessel; and
    (c) means attached to said second end of said tube for extracting and filtering a hazardous material from within said cavity to outside said vessel through said tube, said means maintaining a pressure within said cavity which is less than atmospheric pressure; and wherein said apparatus is portable.

2. The apparatus of claim 1, wherein said means for extracting and filtering said hazardous material through said tube comprises a pump and filter attached to said tube.

3. The apparatus of claim 1 further comprising a hazardous material sampling port extending through the vessel.

4. The apparatus of claim 1 wherein the side walls are substantially rigid.

5. The apparatus of claim 1 wherein the side walls are flexible.

6. The apparatus of claim 1 wherein the side walls are inflatable.

7. The apparatus of claim 1 further comprising an apron attached to and surrounding the side walls at a wall edge opposite to the cover.

8. The apparatus of claim 7 further comprising means for attaching the apron to a foundation.

9. The apparatus of claim 1 further comprising an injection orifice extending through the vessel.

10. The apparatus of claim 1, wherein said cover and side walls are comprised of a material selected from the group consisting of rubber and plastics.

11. A method of containing a hazardous material, which comprises:
    (a) surrounding said hazardous material with a hazardous material containment apparatus which comprises a vapor and aerosol containment vessel comprising a cover and side walls attached around a perimeter of said cover, which cover and side walls define an open central cavity therein; each of said cover and side walls being composed of material which resists penetration of gases, vapors, aerosols and airborne particulates therethrough; a tube extending through said vessel, said tube having a first end open at a point inside said cavity and a second end at a point outside said vessel; means attached to said second end of said tube for extracting and filtering a hazardous material from within said cavity to outside said vessel through said tube, said means maintaining a pressure within said cavity which is less than atmospheric pressure, and wherein said apparatus is portable; and
    (b) extracting and filtering the hazardous material from within said cavity to outside said vessel through said tube.

12. The method of claim 11, wherein said means for extracting and filtering said hazardous material through said tube comprises a pump and filter attached to said tube.

13. The method of claim 11 further comprising a hazardous material sampling port extending through the vessel.

14. The method of claim 11 wherein the side walls are substantially rigid.

15. The method of claim 11 wherein the side walls are flexible.

16. The method of claim 11 wherein the side walls are inflatable.

17. The method of claim 11 further comprising an apron attached to and surrounding the side walls at a wall edge opposite to the cover.

18. The method of claim 17 further comprising means for attaching the apron to a foundation.

19. The method of claim 11 further comprising an injection orifice extending through the vessel.

20. The method of claim 19, further comprising injecting hazard mitigation materials through said injection orifice into said vessel.

21. The method of claim 11, wherein said cover and side walls are comprised of a material selected from the group consisting of rubber and plastics.

* * * * *